United States Patent [19]

Lung

[11] Patent Number: 5,195,176
[45] Date of Patent: Mar. 16, 1993

[54] METHOD AND APPARATUS TO ENHANCE LASER PRINTER SPEED AND FUNCTIONALITY

[75] Inventor: James C. Y. Lung, San Jose, Calif.

[73] Assignee: Destiny Technology Corporation, Milpitas, Calif.

[21] Appl. No.: 758,984

[22] Filed: Sep. 9, 1991

[51] Int. Cl.$^5$ .............................................. G06K 15/00
[52] U.S. Cl. ..................................... 395/115; 395/110
[58] Field of Search ............... 395/101, 107, 110, 115, 395/112, 114, 150, 151, 164, 166, 500, 400; 358/404, 261.4, 444; 400/61-62, 171, 69; 340/735, 799

[56] References Cited

U.S. PATENT DOCUMENTS

| | | | |
|---|---|---|---|
| 4,686,525 | 8/1987 | Nagata | 395/115 |
| 4,908,637 | 3/1990 | Chung et al. | 395/115 |
| 5,051,925 | 9/1991 | Kadono et al. | 395/150 |
| 5,137,379 | 8/1992 | Ukai et al. | 395/110 |
| 5,142,614 | 8/1992 | Schneider et al. | 395/115 |

*Primary Examiner*—Arthur G. Evans
*Attorney, Agent, or Firm*—Rosenblum, Parish & Isaacs

[57] ABSTRACT

Method and apparatus to enhance laser printer speed and functionality including a general purpose computer, a laser printer, and a modified laser printer font cartridge, comprised of a 21-bit wide address bus, a read-only data bus, a page register, an address counter, a data counter, a font ROM module, an address-to-data converter, and a co-processor. The address bus is coupled to the laser printer and carries either address information to access locations in the co-processor or the font ROM, or data to be input to the co-processor. When the address bus carries only address information, the quantity of accessible memory locations is increased by mapping the contents of the page register with the bit code carried by the address bus. Thus, font pattern data may be read from the font ROM memory location represented by the combination of the page register contents and bit code carried by the address bus. However, if special information is loaded into the data counter, then the information carried by the address bus is actually data to be written to the co-processor. The data is transferred from the address bus, by the address-to-data converter, to the location in the co-processor represented by the combination of the contents of the page register and the address counter. The data bus is coupled to the laser printer and carries either processed font pattern data from the co-processor, or unprocessed font pattern data from the font ROM to the laser printer.

32 Claims, 10 Drawing Sheets

FIG 1

(PRIOR ART)

NORMAL READ CYCLE

SETUP-WRITE-EMULATION CYCLE

TRANSFER-WRITE-EMULATION CYCLE

SETUP-WRITE-EMULATION CYCLE

FIG. 7A

NORMAL READ CYCLE

FIG. 7B

EFFECTIVE ADDRESS =1000000H RELATIVE TO BASE ADDRESS

SETUP-WRITE-EMULATION CYCLE

FIG. 7C

TRANSFER-WRITE-EMULATION CYCLE

FIG. 7D

TRANSFER-WRITE-EMULATION CYCLE

FIG. 7E

1. NORMAL READ CYCLE

2. SETUP-WRITE-EMULATION CYCLE

3. SETUP-WRITE-EMULATION CYCLE

4. TRANSFER-WRITE-EMULATION CYCLE

METHOD AND APPARATUS TO ENHANCE LASER PRINTER SPEED AND FUNCTIONALITY

BACKGROUND OF THE INVENTION

1. Field of the Invention

The present invention relates generally to apparatus and methods for controlling devices such as laser printers. More particularly, the present invention relates to an apparatus and method for improving the through-put of a laser printer and for increasing the number of fonts or styles accessible for output from the laser printer.

2. Brief Description of the Prior Art

Laser printers are one of the most popular printing devices in the office automation environment due to their rapid printing speed, and superior print quality. In addition, an enormous variety of print character fonts or styles are available to the user. Many laser printers provide these fonts, either resident on the laser printer controller board or on a font cartridge that can be easily plugged into slots found on the laser printers.

Figure 1:
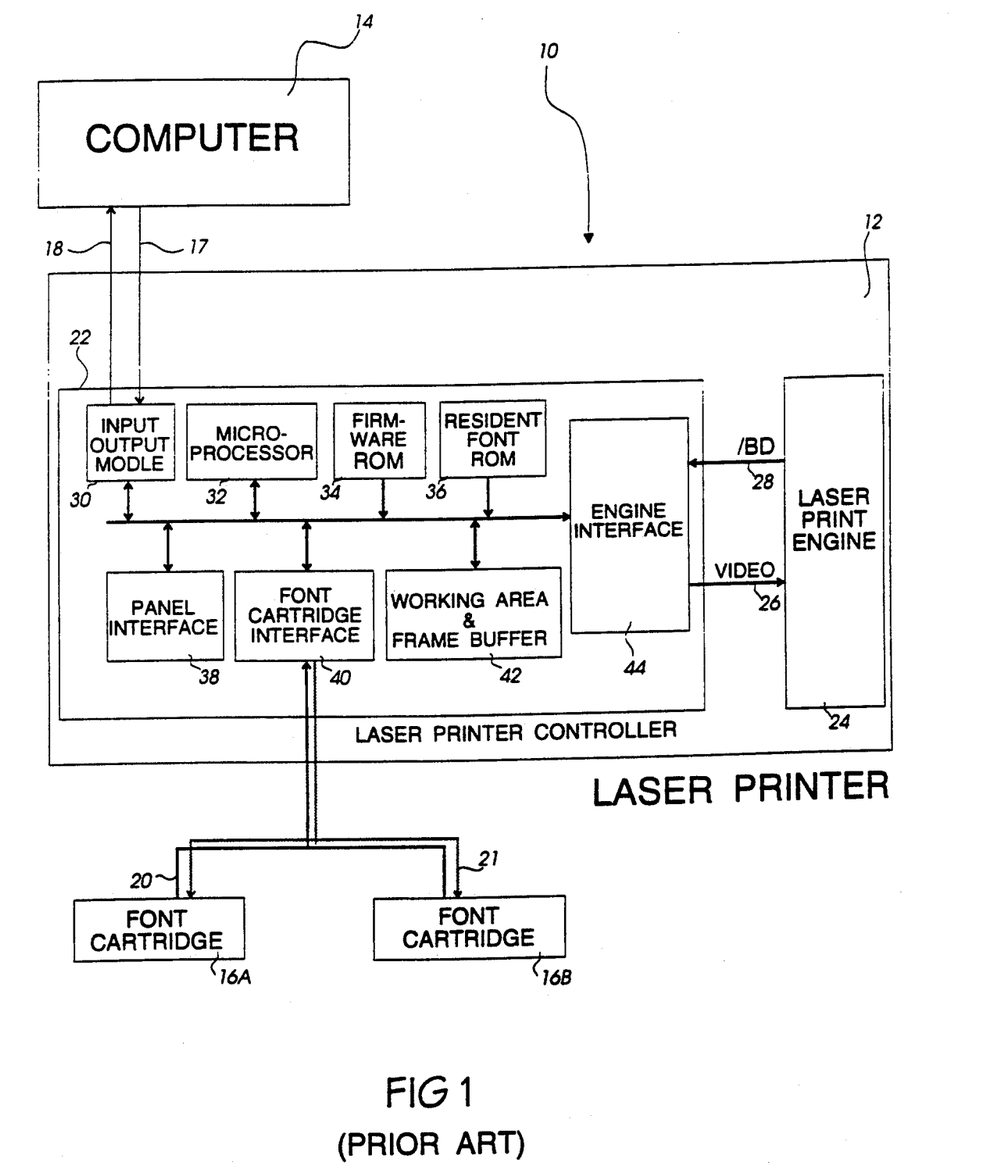
FIG. 1 depicts a laser printer typical in the prior art.

A typical prior art laser printer system 10 is schematically depicted in FIG. 1. The system 10 consists of a laser printer 12, a computer 14, and a plurality of font cartridges 16A and 16B. The printer 12 has a bi-directional data interface with the computer 14 which carries character code and font control commands 17 from the computer 14 and status data 18 from the printer 12. Additionally, the printer 12 accesses the memory content stored on the cartridge 16 via a cartridge address bus 21, and receives the stored font pattern data over data line 20 from the cartridges 16A and 16B.

The printer 12 is comprised of a laser printer controller 22 and a laser print engine 24. The controller 22 sends video data 26 serially to the engine 24, and receives a beam detection (/BD) signal 28 from the engine 24. The /BD signal 28 is used to accomplish synchronization between the controller 22 and the engine 24 on a scanline basis.

The controller 22 consists of an input-output module 30, a microprocessor 32, a firmware ROM module 34, a resident font module ROM 36, a panel interface module 38, a font cartridge interface 40, a working area and frame buffer 42, an engine interface module 44. The input-output module 30 handles the codes and commands 17 from the computer 14, and the status data 18 to the computer 14. The microprocessor 32 handles interpretation and rasterization tasks. The firmware ROM 34 contains the algorithms for accomplishing the interpretation and rasterization tasks. Typically, the controller 22 provides some number of resident fonts, bitmap fonts, or outline fonts, and these are stored in the font ROM 36. The panel interface module 38 displays messages to printer users, and also handles user inquiries entered into the user panel (not shown in FIG. 1). The cartridge interface 40 provides the address decoding necessary to access, via the cartridge address bus 21, the proper location in the font memory (not shown in FIG. 1). The cartridge interface 40 also provides the data buffering functions necessary to receive the stored font pattern data via data line 20. The RAM 42 is the working RAM space required to execute the algorithms contained in the firmware ROM 34. Finally, the engine interface 44 fetches the bitmap data in the RAM 42, serializes the data word into the bitwise data string 26 and sends it to the print engine 24. In addition, the interface 44 receives /BD data 28 and sends it to the RAM 42 for processing by the algorithms contained in the firmware ROM 34.

Figure 2:
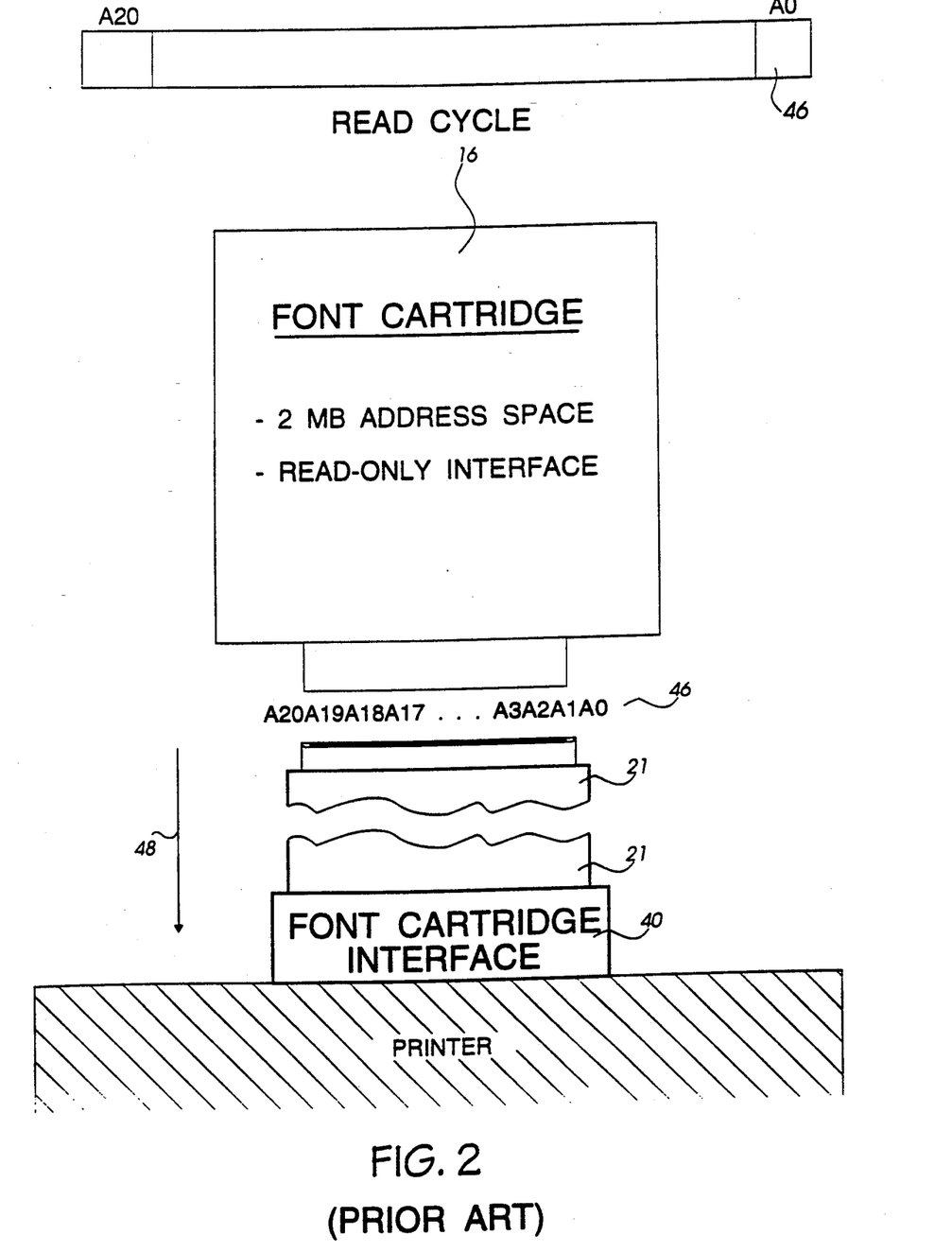
FIG. 2 depicts a font cartridge typical in the prior art.

Referring now to FIG. 2. Laser printers in the prior art typically provide two font cartridge interface slots (not shown in FIG. 2). A slot can accommodate a font cartridge 16 with a 21-bit wide address 46 thereby accessing a maximum of 2 megabytes of font pattern data stored on the cartridge 16. During a read cycle, the 21-bit address 46 is sent from the cartridge interface 40, to the cartridge 16, via the address bus 21. The memory location corresponding to the 21-bit address contains the font pattern data (not shown in FIG. 2). The font pattern data is sent from the cartridge 16 to the cartridge interface 40, via the data line 20 (not shown in FIG. 2). Since the pattern data flows in a uni-directional (i.e. read-only) path 48 from the cartridge 16 to the cartridge interface 40, writing data or code to the cartridge 16 is prohibited.

A major problem in the prior art is that the microprocessor 32 is overloaded with computationally intensive tasks. The font pattern data received by the cartridge interface 40 must be processed by the microprocessor 32 into an outline font data set and then into bitmap character data and then is transferred to the RAM 42 and ultimately ported to the engine 24. This is a computationally intensive task for the microprocessor 32 to perform and slows down the overall through-put of the printer 12. A co-processor installed on board the cartridge 16 could alleviate the microprocessor 32 of some computational tasks by processing the pattern data into the bitmap character data. Since the co-processor typically renders the bitmap character data at a much faster speed than the microprocessor 32 can, a significant increase in through-put performance can be achieved. However, placing the co-processor on board the cartridge 16 would require input to the co-processor from the microprocessor 32. The problem is that the cartridge 16 cannot accommodate a write operation from the microprocessor 32 to the co-processor since the data line 20 is uni-directional in the read-only direction. This severe interface limitation precludes putting any processing capability on-board the font cartridge thereby limiting the processing through-put of the laser print.

Another problem in the prior art is the relatively small number of font patterns that are accessible by the laser printer. One prior art invention that attempts to solve this problem just increases the number of font cartridges that can be simultaneously connected to the printer, i.e. increases the number of font cartridge slots available on the printer. Chen et al. (U.S. Pat. No. 4,908,637) discloses a technique to increase the number of font cartridge slots on a laser printer. A one piece adaptor device has one end that is fitted for connection into the font cartridge slot existing on the printer. The other end of the adapter can accommodate the insertion of two standard font cartridges. Thus, Chen's device expands the number of font cartridge slots physically available on a laser printer yet the number of fonts accessible on any one cartridge is still limited by the address space assigned to the font cartridge slot. Since the most efficient way to access all the available fonts is to store as many fonts on the font cartridge as possible it is highly desirable to increase the font memory size resident on the font cartridges. The problem is that the address bus 21 to the cartridges limits the accessible memory space. As discussed previously, a maximum of 2 megabytes can be accessed with the 21-bit wide address scheme 46 common to prior art font cartridges. Placing a large number of fonts on a cartridge would quickly overload the access capability of the font cartridges. For example, the Asian language font such as the Japanese Kanji ideograph glyph requires an outline font data set that takes more than 5 megabytes of space allocation which exceeds the address space allocated for font cartridge slots on the most popular family of laser printers. Thus the laser printers are limited to a relatively small set of font patterns by the addressing scheme 46 found on the font cartridges typical in the prior art.

SUMMARY OF THE PRESENT INVENTION

It is therefore an object of the present invention to increase the through-put of an existing laser printer system and to increase the quantity of accessible fonts that can be stored on a modified font cartridge while maintaining the existing font cartridge to laser printer hardware interface.

Briefly, a preferred embodiment of the present invention includes a general purpose computer, a laser printer, and a modified laser printer font cartridge, comprised of a 21-bit wide address bus, a read-only data bus, a page register, an address counter, a data counter, a font ROM module, an address-to-data converter, and a co-processor. The address bus is coupled to the laser printer and carries either address information to access locations in the co-processor or the font ROM, or data to be input to the co-processor. When the address bus carries only address information, the quantity of accessible memory locations is increased by mapping the contents of the page register with the bit code carried by the address bus. Thus, font pattern data may be read from the font ROM memory location represented by the combination of the page register contents and bit code carried by the address bus. However, if special information is loaded into the data counter, then the information carried by the address bus is actually data to be written to the co-processor. The data is transferred from the address bus, by the address-to-data converter, to the location in the co-processor represented by the combination of the contents of the page register and the address counter. The data bus is coupled to the laser printer and carries either processed font pattern data from the co-processor, or unprocessed font pattern data from the font ROM to the laser printer.

An advantage of the present invention is to install a co-processor on board the font cartridge thereby increasing the through-put of the laser printer.

Another advantage of the present invention is to reconfigure a heretofore read only device into a read and write-emulation device without altering the existing font cartridge hardware interface.

Still another advantage of the present invention is to increase the size of the font memory that can reside on board a font cartridge without altering the existing font cartridge hardware interface.

These and the other objects and advantages of the present invention will no doubt become apparent to those skilled in the art after having read the following detailed description of the preferred embodiment illustrated in the several figures of the drawing.

DESCRIPTION OF THE PREFERRED EMBODIMENT

Figure 3:
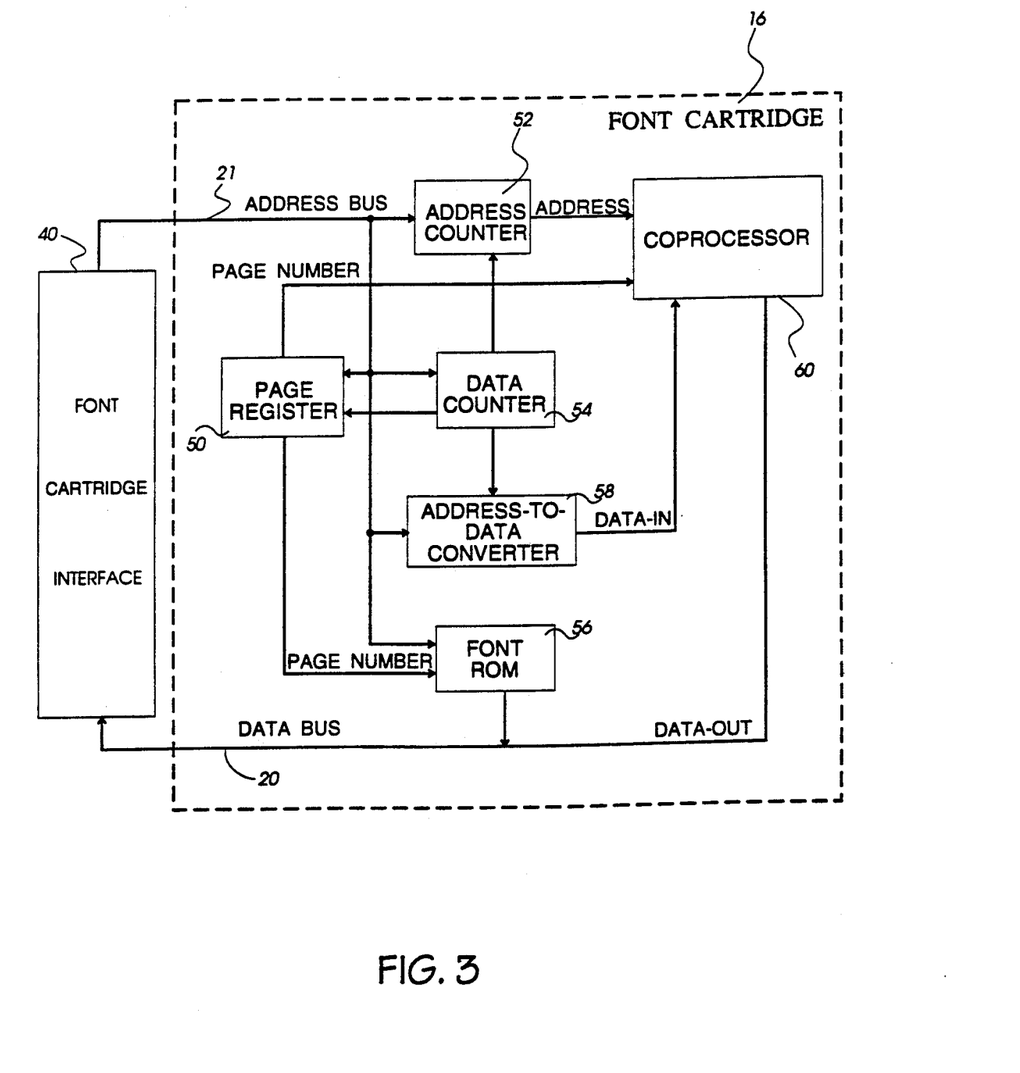
FIG. 3 illustrates the improved font cartridge embodied in the present invention.

Referring now to FIG. 3, the font cartridge 16 is connected to the font cartridge interface 40 via the font pattern data bus 20 and the cartridge address bus 21. The cartridge 16 is comprised of a page register 50, an address counter 52, a data counter 54, a font ROM section 56, an address-to-data converter 58, and a co-processor 60. The data bus 20 is a read-only bus and carries either raw or unprocessed font pattern data from the ROM 56, or bitmap character or outline font data from the co-processor 60. The address bus 21 is 21-bits wide and is coupled to the laser printer and may carry either address information to access locations in the co-processor or the font ROM, or data to be input to the co-processor.

The page register 50 increases the number of memory addresses accessible by the address bus 21. A 21-bit wide address bus alone could only access up to 2 megabytes of memory cells. However in the preferred embodiment, the page register 50 is a five-bit register and can therefore access up to 32 pages. Also if each page consists of 1 megabyte of addresses, then the maximum amount of accessible address space can be expanded to 32 pages with each page containing 1 megabyte of address space. The calculation is as follows:

| | |
|---|---|
| total pages available ($2^5$) | 32 pages |
| page size ($\frac{1}{2} \times 2$ MB) | 1 MB |
| total accessible address space<br>= total page × page size<br>= 32 × 1 MB | 32 MB |

The address counter 52 stores an address offset for any operation writing to the co-processor 60. The data counter 54 contents distinguish between a read and write operation and also stores the word count for a particular write operation to the co-processor 60. The font ROM 56 stores the unprocessed font pattern data for a particular font style. The address-to-data converter 58 strips out of the 21-bit wide word carried by the address bus 21 a 16-bit data word that is input to the co-processor 60. The co-processor 60 renders a bitmap character or outline font pattern from the unprocessed font pattern data. The data bus is coupled to the laser printer and carries either the bitmap character data from the co-processor, or the unprocessed font pattern data from the font ROM to the laser printer.

Figure 4:
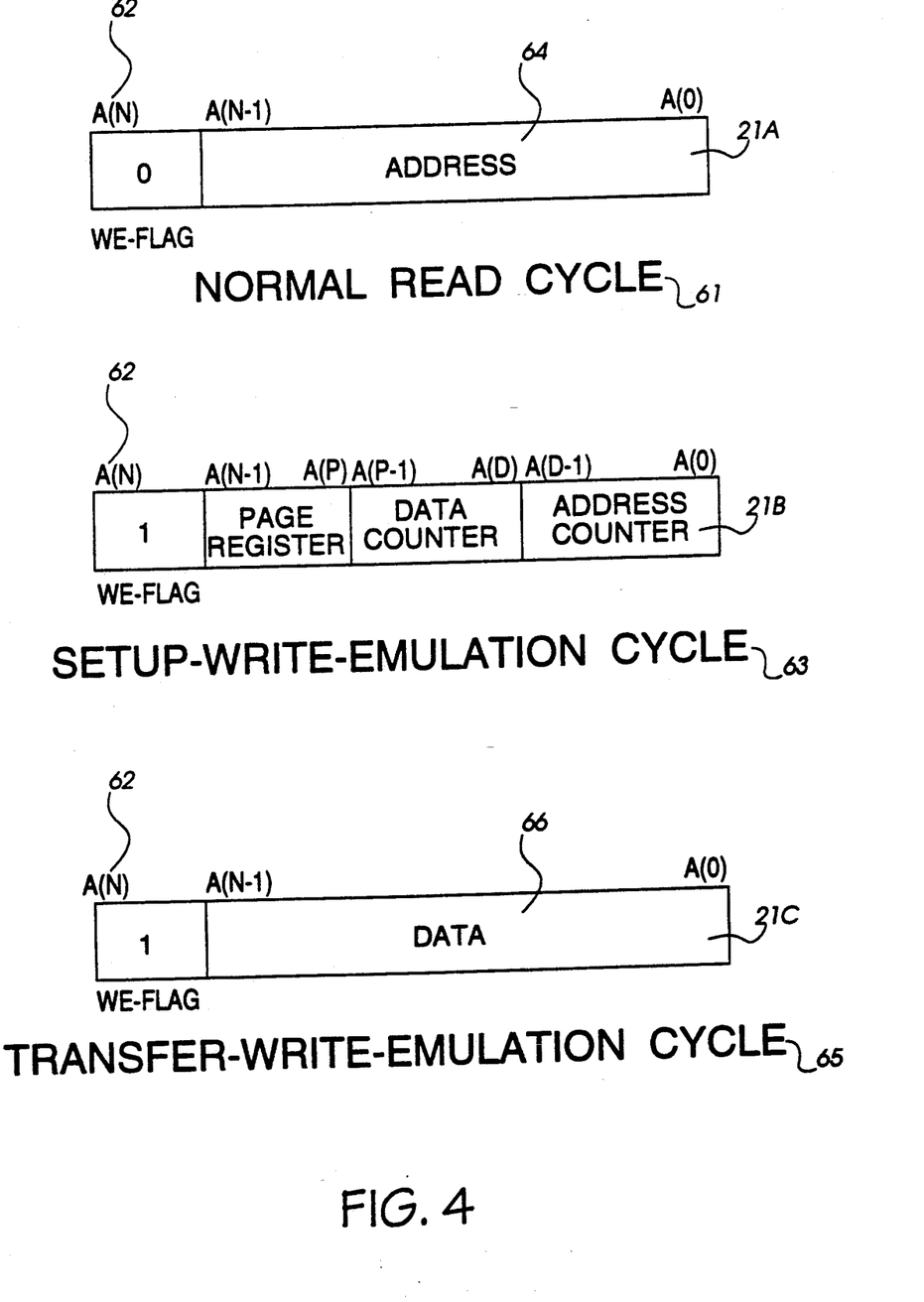
FIG. 4 shows the three distinct operational cycles of the present invention.

In operation there are two major cycles: a normal read cycle, and a write-emulation cycle. Referring now to FIG. 4, the various configurations of the address bus 21 during these operational cycles are depicted. The highest address bit $A_n$ in the address bus 21 is chosen as a write-emulation flag 62. When the flag 62 is "0", it indicates a normal read memory cycle 61; when it is "1", it indicates a write-emulation cycle.

In the normal read cycle 61 the address bus 21A contains the address 64 of the memory location, in the font ROM 56, to be read. In a write-emulation cycle, data on the address bus 21 is written to the normally read-only font cartridge. There are two types of write-emulation cycles: a setup write-emulation cycle 63 and a transfer write-emulation cycle 65. The setup write-emulation cycle 63, which always precedes a transfer write-emulation cycle 65, has data in the address bus 21B which initiates the page register 50, the data counter 54 and the address counter 52. The transfer write-emulation cycle 65 writes data 66 from the address bus 21C to the co-processor 60, via the address-to-data converter 58.

Figure 5:
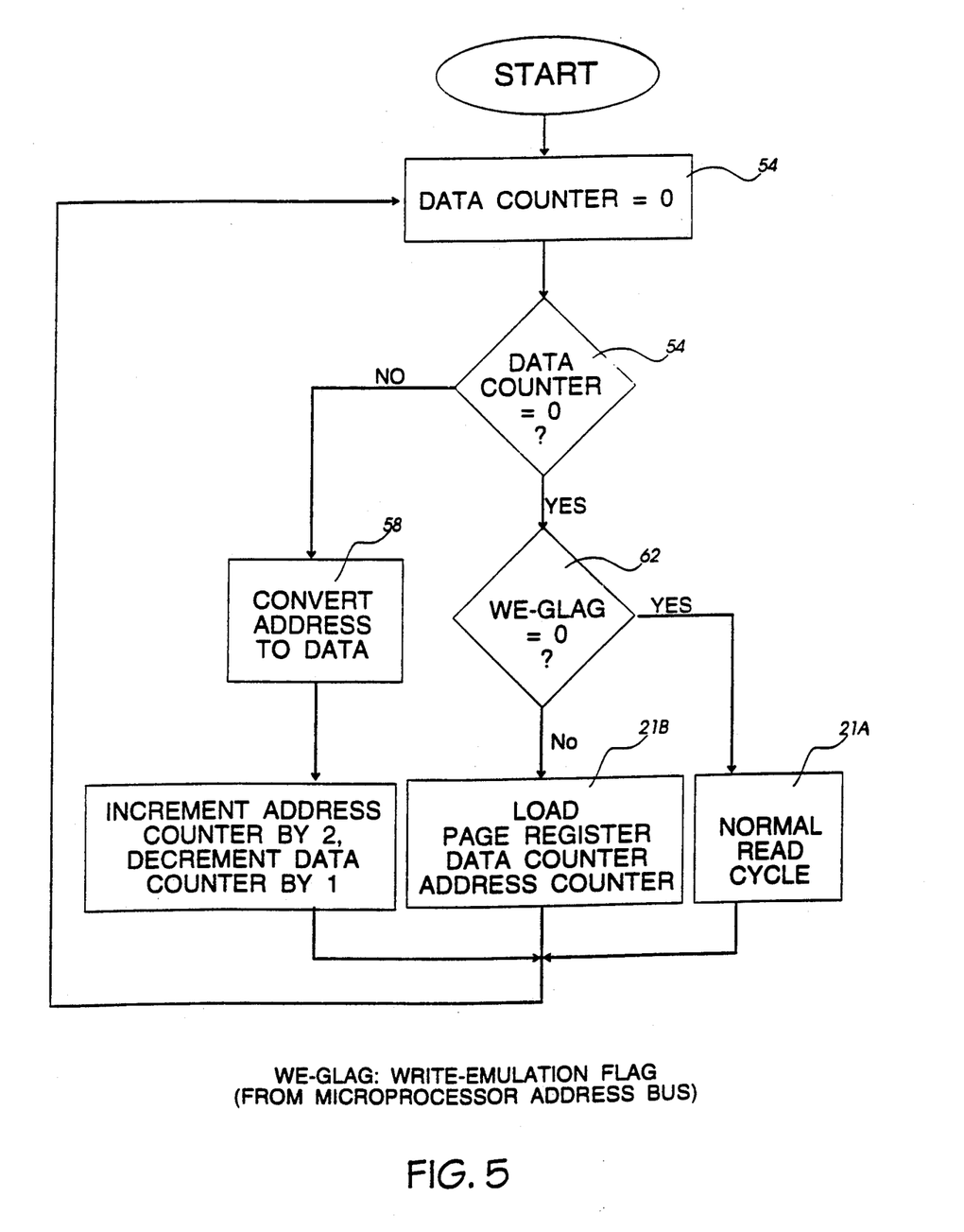
FIG. 5 depicts the operational sequence of the present invention.

Referring now to FIG. 5, wherein a flowchart of the operation is depicted. During machine power up, the data counter 54 is initialized to "0". During the next operation cycle the address bus 21 is configured to operate in either a normal read cycle 61, a setup write-emulation cycle 63, or a transfer write-emulation cycle 65.

If the data counter 54 contents are equal to "0" then the flag bit 62 of the address bus 21 must be checked. If the flag bit 62 is set to "0" then the bit code on the address bus 21 should be used as a normal read cycle 61 operation. Thus, unprocessed font pattern data may be read from the font ROM 56 memory location represented by the combination of the page register 50 contents and the address 64 carried by the address bus 21A and placed on the data bus 20 to the font cartridge interface 40. If the flag bit 62 is set to "1" then the bit code on the address bus 21 should be used as a setup write-emulation cycle 63 operation. Thus, the values found on the address bus 21B are stored in the page register 50, the data counter 54 and the address counter 52. At the completion of this cycle, the data counter 54 contains the number of words to be written to the co-processor, while the address counter 52 indicates where in the co-processor 60 the first word of this string will be stored.

If the data counter 54 contents are greater than "0", then the bit code on the address bus 21 should be used as a transfer write-emulation cycle 65 operation and the information on the address bus 21 is actually data to be written to the co-processor 60. In this operation, the address-to-data converter 58 strips off the sixteen least significant bits 66 on the address bus 21C and sends it to the co-processor 60 location represented by the combination of the contents of the page register 50 and the address counter 52. At the end of any transfer write-emulation cycle, the data counter 54 is decremented by one and the address counter 52 is increased by two. Consecutive transfer write-emulation cycles operations are executed until the data counter 54 contents equal "0".

Figure 6:
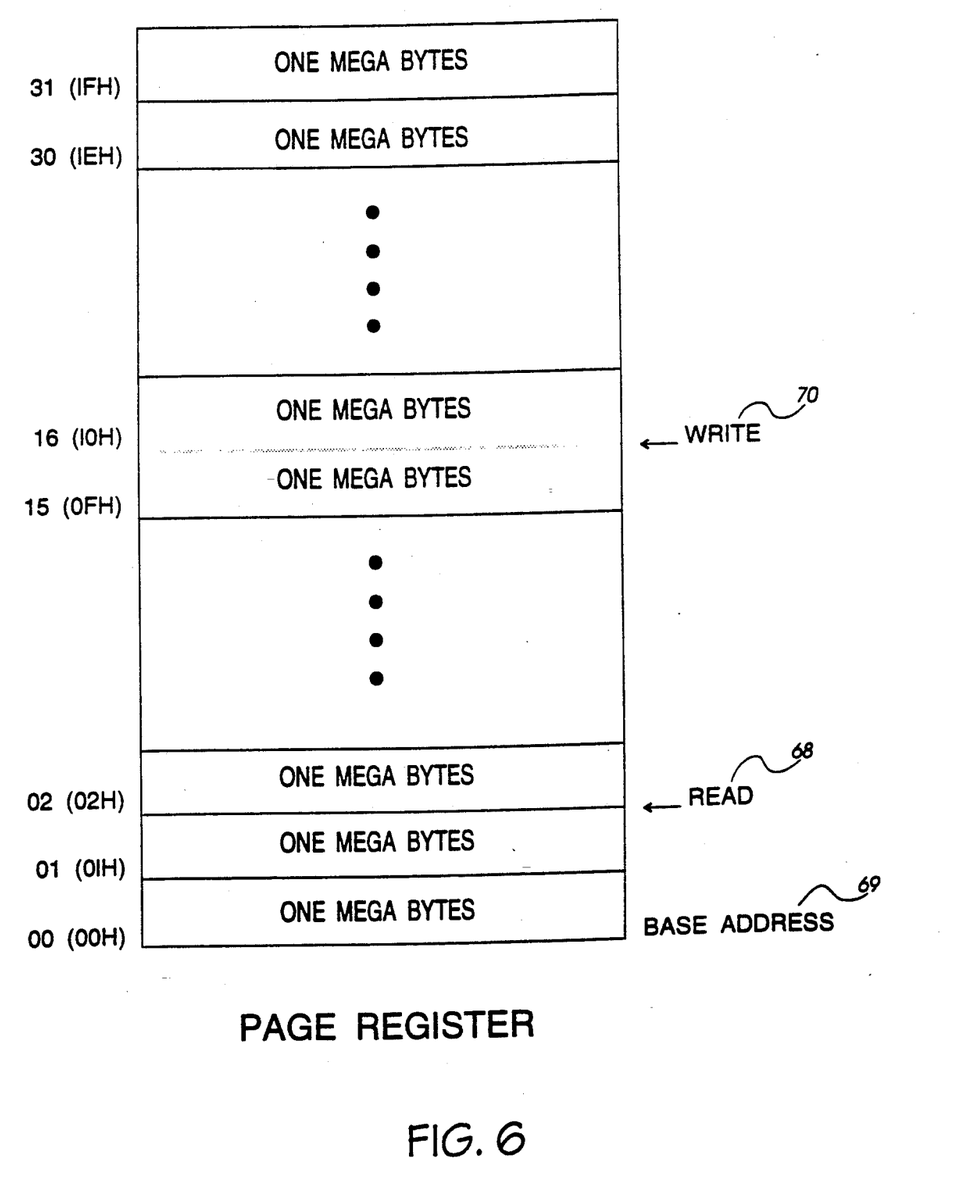
FIG. 6 illustrates the memory expansion scheme.

Referring now to FIG. 6 wherein a specific example of the memory expansion technique is depicted. As described earlier, the address bus to the font cartridge can access up to 2 megabytes of memory locations. In this embodiment, a five bit page register is used to increase the quantity of memory locations that can be accessed by the presently available font cartridge address bus. Since each page is sized at one-half the total memory space or 1 megabyte, the amount of accessible font cartridge memory can be increased to 32 total pages (or 32 megabytes of address space). In operation, data is read from the second page 68, that is a 2 megabyte relative offset from the base address 69 of the cartridge. Data is written to the sixteenth page 70, that is 16 megabyte relative offset from the base address 69 of the font cartridge.

Referring now to FIG. 7, wherein are depicted specific examples of the operational cycles. During the power on period, depicted in FIG. 7A, the data counter 54 is reset to "0", and the flag 62 is set to "1" for the current memory cycle. As previously described, this combination of data counter 54 and flag 62 values signifies the setup write-emulation cycle. The contents of the address bus 21B are loaded into the special purpose registers, i.e. "02H" to the page register 50, "00H" to the data counter 54, and "00H" to the address counter 52. This particular setup write-emulation cycle initializes the address for read operations to the beginning of page two 68, which has 2 megabytes address value relative to the base address.

Figure 7A:
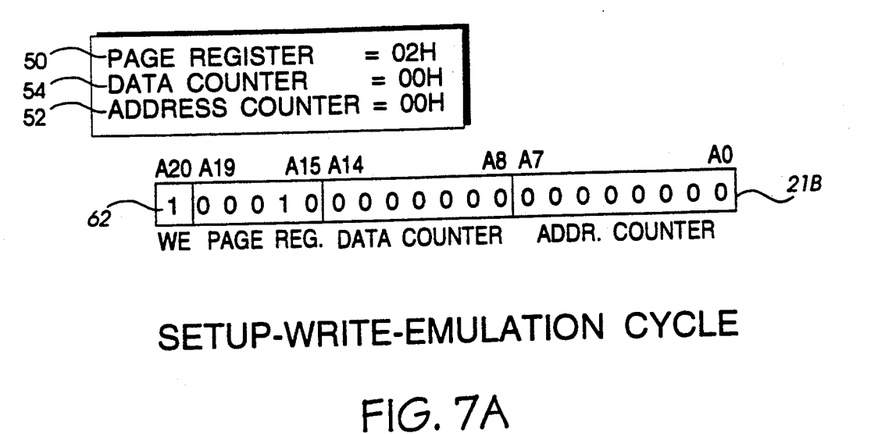
FIGS. 7A-7E illustrate specific examples of the operational cycles of the present invention.
Figure 7B:
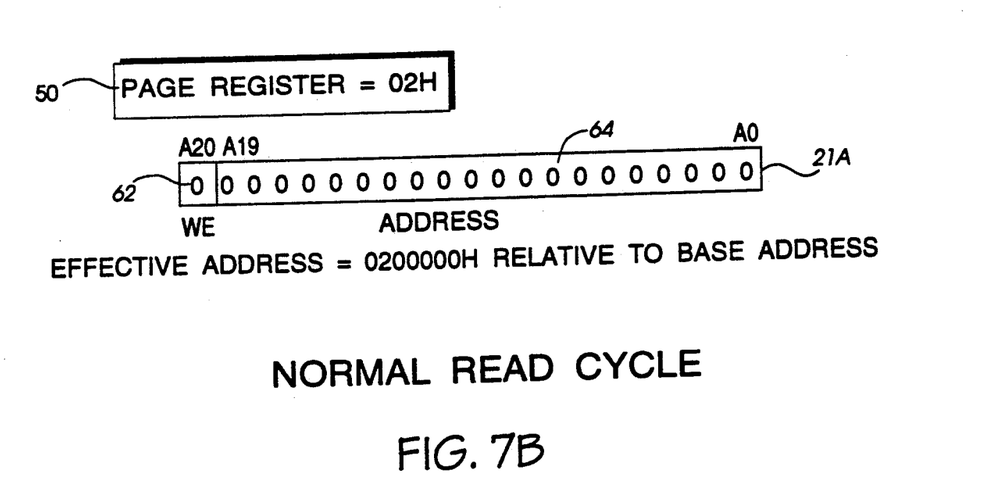

FIG. 7B illustrates the normal read cycle since both the flag 62 and the data counter 54 are set to "0". The address of the memory location to be read is the combination of the page register 50 contents i.e. "02H" and the address 64 carried on the address bus 21A.

Figure 7C:
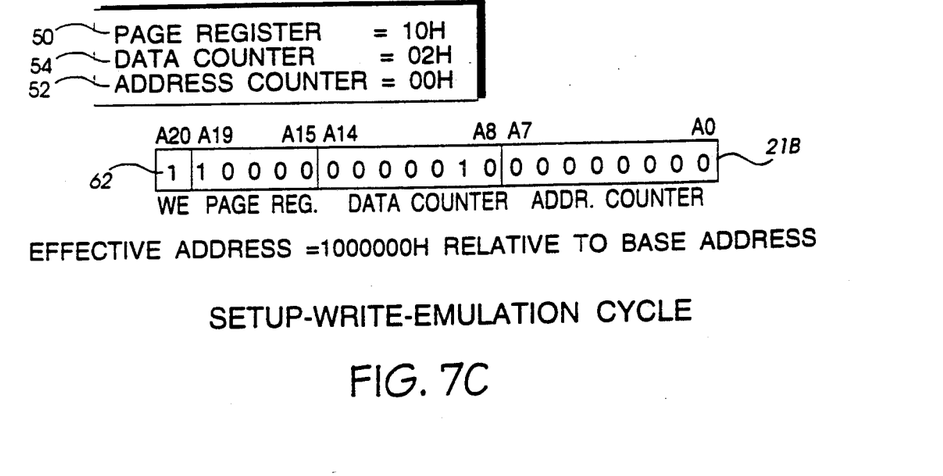

FIG. 7C depicts another setup write-emulation cycle, since the flag 62 and the data counter 54 are set to "0". This cycle prepares the register for the writing of two words of data (i.e. the data counter is set to value "02H") to the co-processor 60. The first word in the subsequent string will be located at the first address space on the sixteenth page 16 (i.e. the page register has been set to "10H").

Figure 7D:
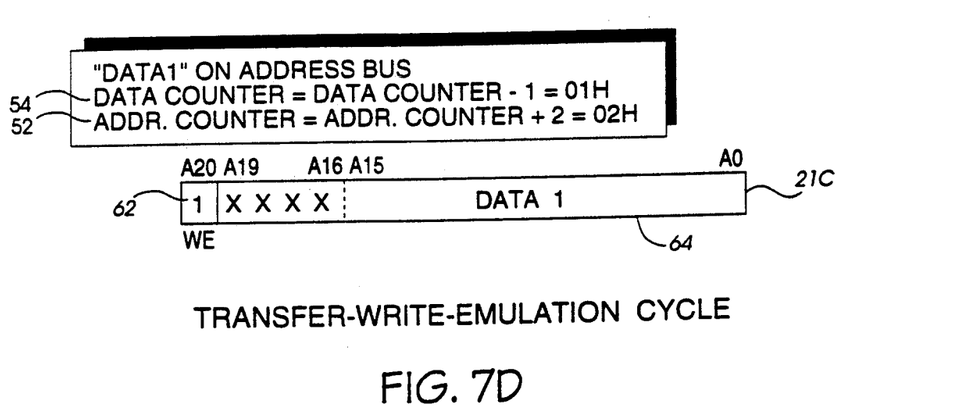
Figure 7E:
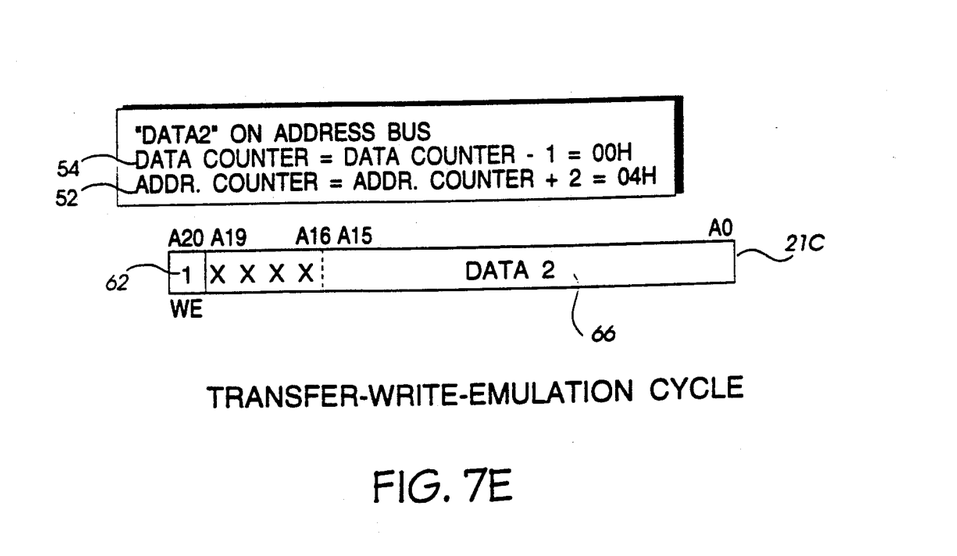

FIG. 7D and 7E illustrate the two subsequent transfer write-emulation cycles. Since the data counter is set to a non-zero value and the flag 62 is set to "1" the memory cycle must be a transfer write-emulation cycle. Further, since the data counter is set to "02H", two words must be transferred to the co-processor 60 memory. During the first transfer cycle, the 16-bit word "data1" 64 that resides on the address bus 21C is transferred by the address-to-data converter 58 and input to the co-processor 60 memory location identified in FIG. 7C. The data counter 54 is then decremented to "01H" and the address counter is increased to "02H". During the second transfer cycle, "data2" 66 that resides on the address bus 21C is transferred by the address-to-data converter 58 and input to the co-processor 60 memory location that is offset by "02H" from the location identified in FIG. 7D. The data counter 54 is decremented to "00H" and the address counter is increased to "04H".

Figure 8:
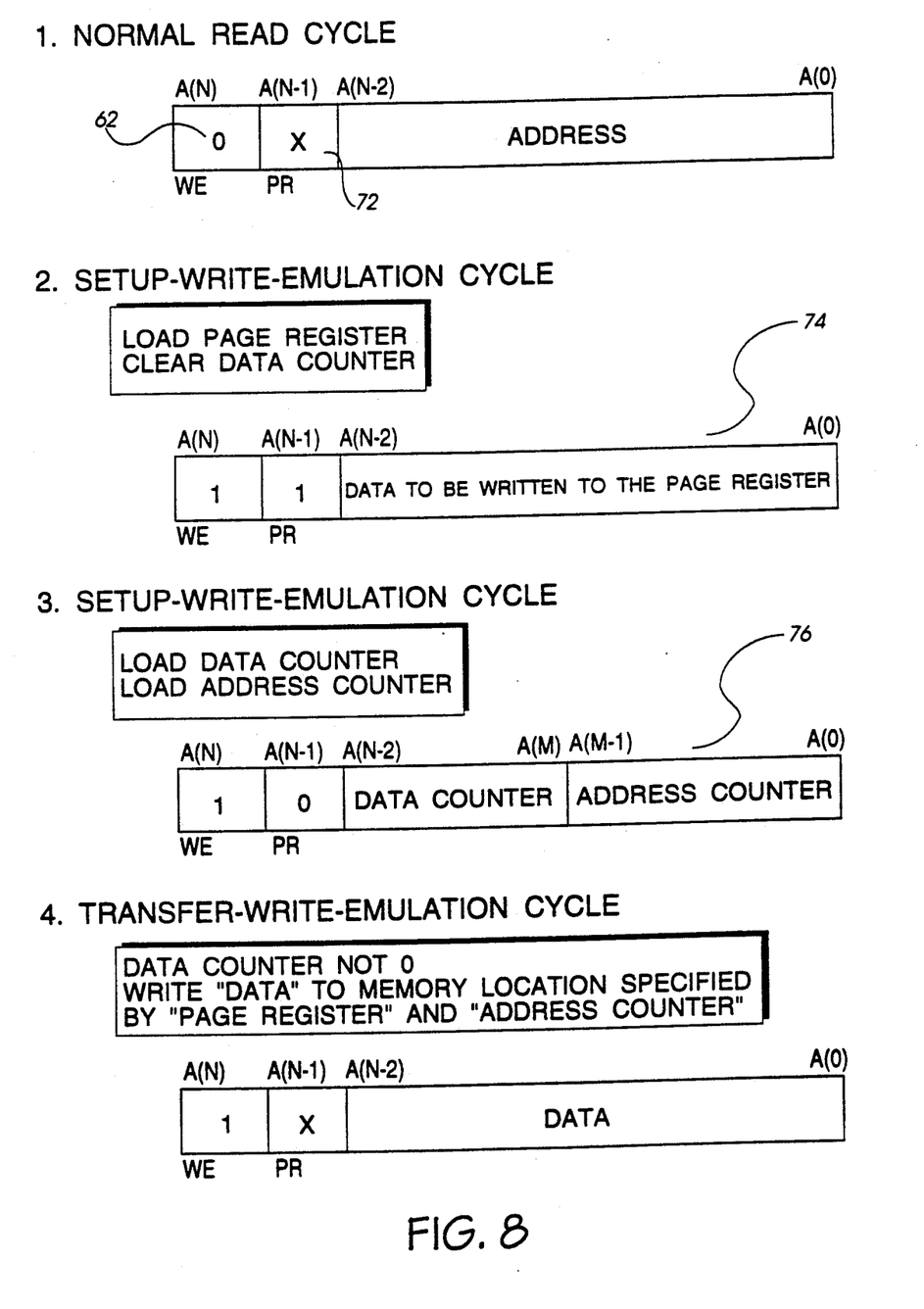
FIGS. 8 and 9 show an alternative embodiment of the present invention.

Although a five-bit page register has been disclosed above as the preferred embodiment, it will be appreciated that in the alternative a different configuration may be used to expand the memory access. Referring now to FIG. 8, in this alternative scheme in addition to the write-emulation flag 62 there is a page register (p/R) flag 72 used to update the page register 50.

Figure 9:
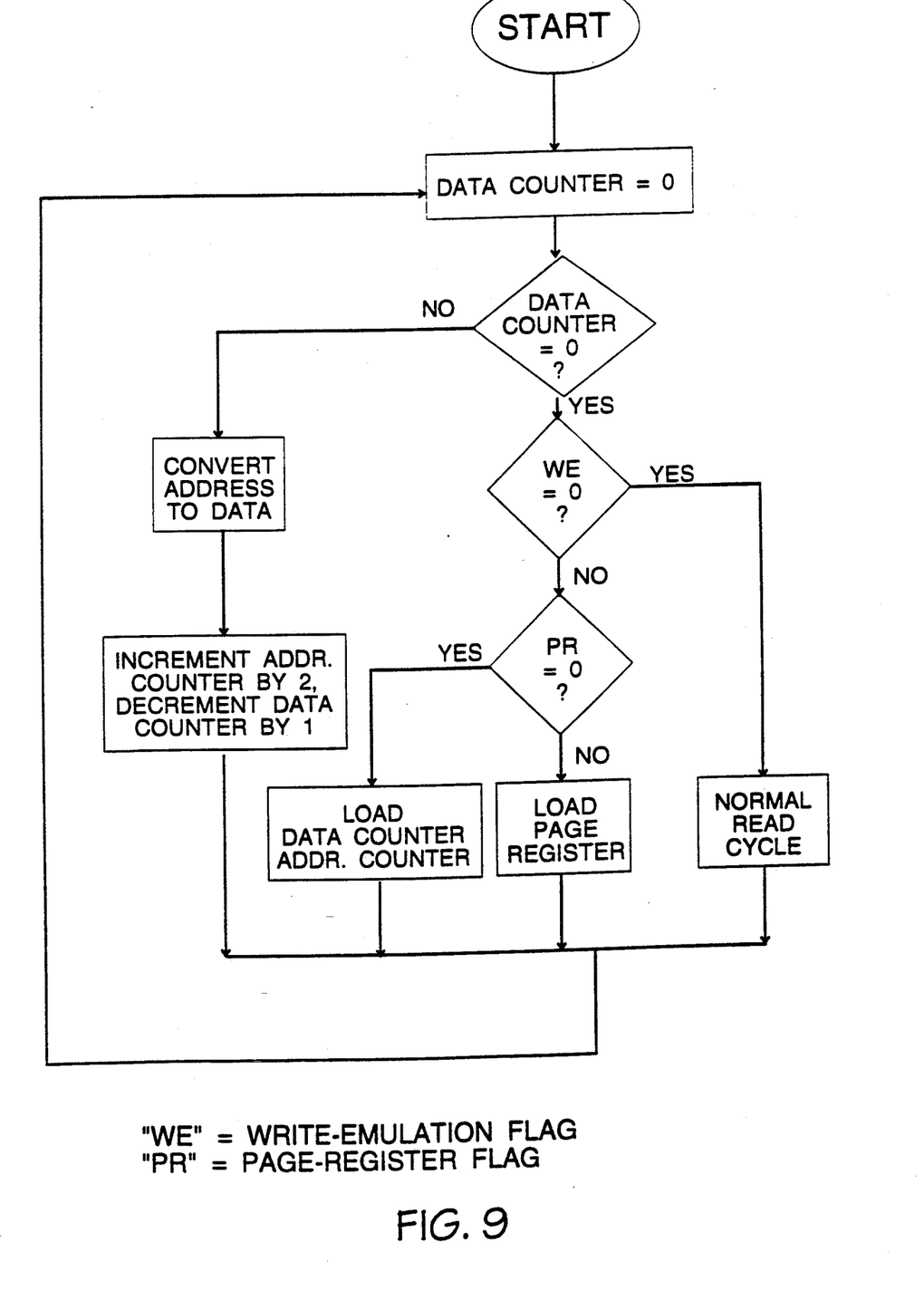

In this alternative embodiment, the page size is decreased to one quarter of the maximum font cartridge address space, but the number of available pages is increased dramatically due to the increased number of bits that can be used to specify a page. There would be two different setup write-emulation cycles. The first cycle 74 loads the page register, and is specified by the flag 62 and the P/R flag 72 set to "1", and the data counter 54 set to "0". The second setup write-emulation cycle 76 loads the data counter and the address counter and is specified by the flag 62 set to "1", the P/R flag and the data counter 54 set to "0". The transfer write-emulation cycle performs the same operation as described earlier, and is specified by the flag 62 set to "1" and the data counter 54 set to a non-zero value. The normal read cycle performs the same operation as in the basic embodiment, and is specified by the flag 62 and the data counter 54 set to "0". FIG. 9 illustrates the flow chart summarizing the previous operational discussion of the alternative embodiment.

Although a preferred embodiment of the present invention has been disclosed above, it will be appreciated that numerous alterations and modifications thereof will no doubt become apparent to those skilled in the art after having read the above disclosures. It is therefore intended that the following claims be interpreted as covering all such alterations and modifications as fall within the true spirit and scope of the invention.

What is claimed is:

1. In a computer driven laser printer system including a general purpose computer, a laser printer, and a font cartridge, an improved font cartridge comprising:
   input bus means for communicating a memory address signal or a command signal from the laser printer;
   output bus means for communicating either an unprocessed font data signal or a bitmap character data signal to the laser printer;
   address counter means coupled to said input bus means for receiving said memory address signal from said laser printer, and responsive to a count signal, and operative to generate an address signal for accessing a memory cell location in a processor;
   address-to-data converter means coupled to said input bus means for receiving said command signal from said laser printer, and responsive to said count signal, and operative to transfer said command signal to said processor;
   page register means coupled to said input bus means for receiving a page designator signal from said laser printer, and responsive to said count signal, and operative to communicate said page designator signal to said processor and to a memory device;
   data counter means coupled to said input bus means for receiving a command count signal communicated from said laser printer, and operative to communicate said count signal to said address counter means, said page register means, and said address-to-data converter means;
   font memory means coupled to said input bus means for receiving said memory address signal from said laser printer, and responsive to said page designator signal, and operative to transfer said unprocessed font data signal from an addressed memory location to said output bus means; and
   co-processor means for processing said bitmap character data signal, responsive to said page designator signal, said address signal, and said command signal, and operative to either transfer said bitmap character data signal from a memory location within said co-processor means to said output bus means or to write said command signal to a memory location within said co-processor means, whereby the improved font cartridge, on command from said laser print controller, converts the font data stored on-board the cartridge into said bitmap character data signal.

2. An improved font cartridge as recited in claim 1 wherein said input bus means selectively communicates in a normal read cycle mode, a setup write-emulation cycle mode, or a transfer write-emulation cycle mode, as selected by the laser print controller of said laser printer.

3. An improved font cartridge as recited in claim 2 wherein said input bus means when configured for the normal read cycle mode communicates a word including a write-emulation flag bit field and an address designation field.

4. An improved font cartridge as recited in claim 3 wherein said input bus means when configured for the setup write-emulation cycle mode communicates a word including a write-emulation flag bit field, a page register means value field, a data counter means value field, and an address counter means value field.

5. An improved font cartridge as recited in claim 4 wherein said input bus means when configured for the transfer write-emulation cycle mode communicates a word including a write-emulation flag bit field and a data word field.

6. An improved font cartridge as recited in claim 1 wherein said input bus means selectively communicates in a normal read cycle mode, a first setup write-emulation cycle mode, a second setup write-emulation cycle mode, or a transfer write-emulation cycle mode, as selected by the laser print controller of said laser printer.

7. An improved font cartridge as recited in claim 6 wherein said input bus means when configured for the normal read cycle mode communicates a word including a write-emulation flag bit field and an address designation field.

8. An improved font cartridge as recited in claim 7 wherein said input bus means when configured for the first setup write-emulation cycle mode communicates a word including a write-emulation flag bit field, a page register flag bit field, a page register means value field.

9. An improved font cartridge as recited in claim 8 wherein said input bus means when configured for the second setup write-emulation cycle mode communicates a word including a write-emulation flag bit field, a page register flag bit field, a data counter means value field, and an address counter means value field.

10. An improved font cartridge as recited in claim 9 wherein said input bus means when configured for the transfer write-emulation cycle mode communicates a word including a write-emulation flag bit field and a data word field.

11. An intelligent font cartridge for connection to the font cartridge interface of a laser printer comprising:
   a connector for connection to said interface;
   input bus means for communicating a memory address signal or a command signal from the laser printer;
   output bus means for communicating either an unprocessed font data signal or a bitmap character data signal to the laser printer;
   address counter means coupled to said input bus means for receiving said memory address signal from said laser printer, and responsive to a count signal, and operative to generate an address signal for accessing a memory cell location in a processor;
   address-to-data converter means coupled to said input bus means for receiving said command signal from said laser printer, and responsive to said count signal, and operative to transfer said command signal to said processor;

page register means coupled to said input bus means for receiving a page designator signal from said laser printer, and responsive to said count signal, and operative to communicate said page designator signal to said processor and to a memory device;

data counter means coupled to said input bus means for receiving a command count signal communicated from said laser printer, and operative to communicate said count signal to said address counter means, said page register means, and said address-to-data converter means;

font memory means coupled to said input bus means for receiving said memory address signal from said laser printer, and responsive to said page designator signal, and operative to transfer said unprocessed font data signal from an addressed memory location to said output bus means; and co-processor means for processing said bitmap character data signal, responsive to said page designator signal, said address signal, and said command signal, and operative to either transfer said bitmap character data signal from a memory location within said co-processor means to said output bus means or to write said command signal to a memory location within said co-processor means, whereby the improved font cartridge, on command from said laser print controller, converts the font data stored on-board the cartridge into said bitmap character data signal.

12. An intelligent font cartridge as recited in claim 11 wherein said input bus means selectively communicates in a normal read cycle mode, a setup write-emulation cycle mode, or a transfer write-emulation cycle mode, as selected by the laser print controller of said laser printer.

13. An intelligent font cartridge as recited in claim 12 wherein said input bus means when configured for the normal read cycle mode communicates a word including a write-emulation flag bit field and an address designation field.

14. An intelligent font cartridge as recited in claim 13 wherein said input bus means when configured for the setup write-emulation cycle mode communicates a word including a write-emulation flag bit field, a page register means value field, a data counter means value field, and an address counter means value field.

15. An intelligent font cartridge as recited in claim 14 wherein said input means bus when configured for the transfer write-emulation cycle mode communicates a word including a write-emulation flag bit field and a data word field.

16. An intelligent font cartridge as recited in claim 11 wherein said input bus means selectively communicates in a normal read cycle mode, a first setup write-emulation cycle mode, a second setup write-emulation cycle mode, or a transfer write-emulation cycle mode, as selected by the laser print controller of said laser printer.

17. An intelligent font cartridge as recited in claim 16 wherein said input bus means when configured for the normal read cycle mode communicates a word including a write-emulation flag bit field and an address designation field.

18. An intelligent font cartridge as recited in claim 17 wherein said input bus means when configured for the first setup write-emulation cycle mode communicates a word including a write-emulation flag bit field, a page register flag bit field, a page register means value field.

19. An intelligent font cartridge as recited in claim 18 wherein said input bus means when configured for the second setup write-emulation cycle mode communicates a word including a write-emulation flag bit field, a page register flag bit field, a data counter means value field, and an address counter means value field.

20. An intelligent font cartridge as recited in claim 19 wherein said input bus means when configured for the transfer write-emulation cycle mode communicates a word including a write-emulation flag bit field and a data word field.

21. A method of increasing the throughput and the quantity of memory addresses accessible in a laser printer system including a general purpose computer, a laser printer, and a font cartridge, comprising the steps of:

(1) providing a font cartridge adapted to connect to a laser printer font cartridge interface and including an input bus, an output bus, an address counter, an address-to-data converter, a page register, a data counter, a font memory having a predetermined quantity of accessible memory addresses, and a co-processor;

(2) generating a communication word having a first portion of bits, at least one data bit of which constitutes a signal flag the state of which determines whether said communication word corresponds to a write-emulation cycle instruction or a read cycle instruction, and having a second portion including a plurality of data bits which
   (a) comprise page register information, data counter information, and address counter information when said signal flag is the first occurrence, in a sequence, of a first data state, and
   (b) comprise transferred data information when said signal flag is of said first data state and the current communication word immediately follows a communication word the signal flag of which is of said first data state, and
   (c) comprise address information when said signal flag is of a second data state;

(3) inputting a first write-emulation cycle communication word to said input bus to load said page register information into said page register, said data counter information into said data counter, said address counter information into said address counter, thereby setting up said address counter, said data counter, and said page register for the next cycle;

(4) inputting a subsequent write-emulation cycle communication word, or a second write-emulation cycle communication word, or a read cycle communication word to said input bus;

(5) determining if the communication word input to said input bus is a first write-emulation cycle communication word, or a second write-emulation cycle communication word, or a read cycle communication word;

(6) performing a reset operation, a read operation, or a write operation depending upon the type of communication word input in the preceding step.

22. A method as recited in claim 21 wherein said step of providing said font memory having a predetermined quantity of accessible memory addresses includes creating a page set having a plurality of page designators, segmenting the total address space of said modified font cartridge into a plurality of address segments, and assigning to an individual address segment each of the plurality of said page designators.

23. A method as recited in claim 21 wherein said step of determining if the communication word input to said input bus is a first write-emulation cycle communication word, or a second write-emulation cycle communication word, or a read cycle communication word, includes:
    (a) reading the contents of said data counter;
    (b) if said data counter contents are at a third data state then causing the data bits in said second portion to be input through said address-to-data converter to said co-processor causing it to output to said output bus the corresponding bitmap character data;
    (c) if said data counter contents are at a fourth data state then causing said signal flag to be read;
    (d) reading the state of said signal flag;
    (e) if the state of said signal flag is at said first data state then causing said page register information to be loaded into said page register, said data counter information to be loaded into said data counter, and said address counter information to be loaded into said address counter, thereby setting up said address counter, said data counter, and said page register for the next cycle;
    (f) if the state of said signal flag is at said second data state then causing the data bits in said second portion to address a particular memory location in said font memory causing it to output the contents thereof to said output bus.

24. A method of increasing the throughput and the quantity of memory addresses accessible in a laser printer system including a general purpose computer, a laser printer, and a font cartridge, comprising the steps of:
    (1) providing a font cartridge adapted to connect to a laser printer font cartridge interface and including an input bus, an output bus, an address counter, an address-to-data converter, a page register, a data counter, a font memory having a predetermined quantity of accessible memory addresses, and a co-processor;
    (2) generating a communication word having a first portion of bits, at least one data bit of which constitutes a first signal flag the state of which determines whether said communication word corresponds to a write-emulation cycle instruction or a read cycle instruction, and having a second portion of bits, at least one data bit of which constitutes a second signal flag the state of which determines whether said communication word corresponds to a first write-emulation cycle instruction or a second write-emulation cycle instruction, and having a third portion including a plurality of data bits which
        (a) comprise page register information when said first and second signal flags are both set to a first data state and it is the first occurrence, in a sequence, of said first data state, and
        (b) comprise data counter information and address counter information when said first signal flag is set to said first data state while said second signal flag is set to a second data state and it is the second occurrence of said first data state and the first occurrence of said second data state, and
        (c) comprise transferred data information when said first signal flag is of said first data state and the current communication word immediately follows a communication word the first signal flag of which is of said first data state, and
        (d) comprise address information when said first signal flag is of said second data state;
    (3) inputting a first write-emulation cycle communication word to said input bus to load said page register information into said page register, thereby setting up said page register for the next cycle;
    (4) inputting a second write-emulation cycle communication word to said input bus to load said data counter information into said data counter and said address counter information into said address counter, thereby setting up said address counter and said data counter for the next cycle;
    (5) inputting a subsequent first write-emulation cycle communication word, or a subsequent second write-emulation cycle communication word, or a third write-emulation cycle communication word, or a read cycle communication word to said input bus;
    (6) determining if the communication word input to said input bus is a first write-emulation cycle communication word, or a second write-emulation cycle communication word, or a third write-emulation cycle communication word, or a read cycle communication word;
    (7) performing a first reset operation, a second reset operation, a read operation, or a write operation depending upon the type of communication word input in the preceding step.

25. A method as recited in claim 24 wherein said step of providing said font memory having a predetermined quantity of accessible memory addresses includes creating a page set having a plurality of page designators, segmenting the total address space of said modified font cartridge into a plurality of address segments, and assigning to an individual address segment each of the plurality of said page designators.

26. A method as recited in claim 24 wherein said step of determining if the communication word input to said input bus is a first write-emulation cycle communication word, or a second write-emulation cycle communication word, or a third write-emulation cycle communication word, or a read cycle communication word, includes:
    (a) reading the contents of said data counter;
    (b) if said data counter contents are at a third data state then causing the data bits in said third portion to be input through said address-to-data converter to said co-processor causing it to output to said output bus the corresponding bitmap character data;
    (c) if said data counter contents are at a fourth data state then causing said first signal flag to be read;
    (d) reading the state of said first signal flag;
    (e) if the state of said first signal flag is at said second data state then causing the data bits in said third portion to address a particular memory location in said font memory causing it to output the contents thereof to said output bus;
    (f) if the state of said first signal flag is at said first data state then causing the contents of said second signal flag to be read;
    (g) reading the state of said second signal flag;
    (h) if the state of said second signal flag is at said first data state then causing said page register information to be loaded into said page register, thereby setting up said page register for next cycle;

(i) if the state of said second signal flag is at said second data state then causing said data counter information to be loaded into said data counter, and said address counter information to be loaded into said address counter, thereby setting up said address counter, and said page register for the next cycle.

27. A method of increasing the quantity of memory addresses accessible in a font cartridge and for emulating a write cycle to said font cartridge, comprising the steps of:

(1) providing an intelligent font cartridge adapted to connect to a laser printer font cartridge interface and including an input bus, an output bus, an address counter, an address-to-data converter, a page register, a data counter, a font memory having a predetermined quantity of accessible memory addresses, and a co-processor;

(2) generating a communication word having a first portion of bits, at least one data bit of which constitutes a signal flag the state of which determines whether said communication word corresponds to a write-emulation cycle instruction or a read cycle instruction, and having a second portion including a plurality of data bits which (a) comprise page register information, data counter information, and address counter information when said signal flag is the first occurrence, in a sequence, of a first data state, and (b) comprise transferred data information when said signal flag is of said first data state and the current communication word immediately follows a communication word the signal flag of which is of said first data state;

(3) inputting a first write-emulation cycle communication word to said input bus to load said page register information into said page register, said data counter information into said data counter, said address counter information into said address counter, thereby setting up said address counter, said data counter, and said page register for the next cycle;

(4) inputting a subsequent write-emulation cycle communication word, or a second write-emulation cycle communication word to said input bus;

(5) determining if the communication word input to said input bus is a first write-emulation cycle communication word, or a second write-emulation cycle communication word;

(6) performing a reset operation, or a write operation depending upon the type of communication word input in the preceding step.

28. A method as recited in claim 27 wherein said step of providing said font memory having a predetermined quantity of accessible memory addresses includes creating a page set having a plurality of page designators, segmenting the total address space of said modified font cartridge into a plurality of address segments, and assigning to an individual address segment each of the plurality of said page designators.

29. A method as recited in claim 27 wherein said step of determining if the communication word input to said input bus is a first write-emulation cycle communication word, or a second write-emulation cycle communication word, includes:

(a) reading the contents of said data counter;

(b) if said data counter contents are at a third data state then causing the data bits in said second portion to be input through said address-to-data converter to said co-processor causing it to output to said output bus the corresponding bitmap character data;

(c) if said data counter contents are at a fourth data state then causing said signal flag to be read;

(d) reading the state of said signal flag;

(e) if the state of said signal flag is at said first data state then causing said page register information to be loaded into said page register, said data counter information to be loaded into said data counter, and said address counter information to be loaded into said address counter, thereby setting up said address counter, said data counter, and said page register for the next cycle.

30. A method of increasing the quantity of memory addresses accessible in a font cartridge and for emulating a write cycle to said font cartridge, comprising the steps of:

(1) providing an intelligent font cartridge adapted to connect to a laser printer font cartridge interface and including an input bus, an output bus, an address counter, an address-to-data converter, a page register, a data counter, a font memory having a predetermined quantity of accessible memory addresses, and a co-processor;

(2) generating a communication word having a first portion of bits, at least one data bit of which constitutes a first signal flag the state of which determines whether said communication word corresponds to a write-emulation cycle instruction or a read cycle instruction, and having a second portion of bits, at least one data bit of which constitutes a second signal flag the state of which determines whether said communication word corresponds to a first write-emulation cycle instruction or a second write-emulation cycle instruction, and having a third portion including a plurality of data bits which (a) comprise page register information when said first and second signal flags are both set to a first data state and it is the first occurrence, in a sequence, of said first data state, and (b) comprise data counter information and address counter information when said first signal flag is set to said first data state while said second signal flag is set to a second data state and it is the second occurrence of said first data state and the first occurrence of said second data state, and (c) comprise transferred data information when said first signal flag is of said first data state and the current communication word immediately follows a communication word the first signal flag of which is of said first data state;

(3) inputting a first write-emulation cycle communication word to said input bus to load said page register information into said page register, thereby setting up said page register for the next cycle;

(4) inputting a second write-emulation cycle communication word to said input bus to load said data counter information into said data counter and said address counter information into said address counter, thereby setting up said address counter and said data counter for the next cycle;

(5) inputting a subsequent first write-emulation cycle communication word, or a subsequent second write-emulation cycle communication word, or a third write-emulation cycle communication word;

(6) determining if the communication word input to said input bus is a first write-emulation cycle communication word, or a second write-emulation cycle communication word, or a third write-emulation cycle communication word;

(7) performing a first reset operation, a second reset operation, or a write operation depending upon the type of communication word input in the preceding step.

31. A method as recited in claim 30 wherein said step of providing said font memory having a predetermined quantity of accessible memory addresses includes creating a page set having a plurality of page designators, segmenting the total address space of said modified font cartridge into a plurality of address segments, and assigning to an individual address segment each of the plurality of said page designators.

32. A method as recited in claim 30 wherein said step of determining if the communication word input to said input bus is a first write-emulation cycle communication word, or a second write-emulation cycle communication word, or a third write-emulation cycle communication word, includes:

(a) reading the contents of said data counter;
(b) if said data counter contents are at a third data state then causing the data bits in said third portion to be input through said address-to-data converter to said co-processor causing it to output to said output bus the corresponding bitmap character data;
(c) if said data counter contents are at a fourth data state then causing said first signal flag to be read;
(d) reading the state of said first signal flag;
(e) if the state of said first signal flag is at said first data state then causing the contents of said second signal flag to be read;
(f) reading the state of said second signal flag;
(g) if the state of said second signal flag is at said first data state then causing said page register information to be loaded into said page register, thereby setting up said page register for next cycle;
(h) if the state of said second signal flag is at said second data state then causing said data counter information to be loaded into said data counter, and said address counter information to be loaded into said address counter, thereby setting up said address counter, and said page register for the next cycle.

* * * * *